United States Patent Office 3,226,372
Patented Dec. 28, 1965

3,226,372
NOVEL HETEROCYCLIC COMPOUNDS
AND POLYMERS
William F. Tousignant and Richard C. Sovish, Midland, Mich., assignors to The Dow Chemical Company, Midland, Mich., a corporation of Delaware
No Drawing. Filed June 2, 1961, Ser. No. 114,310
9 Claims. (Cl. 260—85.5)

This invention is concerned with novel compounds and is particularly directed to new monomers characterized as vinylbenzyl oxazolidinones and vinylbenzyl oxazinidinones and novel polymers derived therefrom.

In recent years new polymers and copolymers embodying vinyl oxazolidinone and alkyl-substituted vinyl oxazolidinones have found broad applications as complexing agents for absorbing gases, modifying disinfectants and for such purposes as the clarification of beer and wine. Such known polymers, however, are water soluble and thus may not be readily separable from aqueous media from which it is desirable to remove impurities by complex formation.

It is an object of the present invention to provide novel polymerizable substituted oxazolidinones and oxazinidinones. It is a further object of the invention to provide novel polymers having excellent complexing activity and characterized by water insolubility. Other objects of the invention will become apparent from the following specification and claims.

In accordance with the invention there has been discovered a novel class of polymerizable monomers having the formula

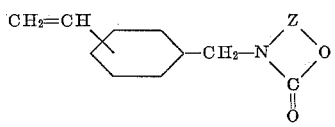

wherein Z represents a bivalent hydrocarbon radical selected from the trimethylene radical, alkylene radicals containing from 2 to 6 carbon atoms and the phenyl ethylene radical. The new N-vinylbenzyl oxazolidinone and oxazinidinone compounds are crystalline solids soluble in organic solvents such as acetone, ether, dioxane and liquid aromatic hydrocarbons, somewhat soluble in liquid aliphatic hydrocarbons such as hexane and substantially insoluble in water and aqueous mineral acid and alkali metal hydroxide solutions. These compounds may be polymerized alone or copolymerized with each other or with other monovinyl compounds, such as styrene, acrylonitrile, vinyl chloride, vinylidene chloride and the like, employing conventional mass or solution polymerization techniques. The resulting polymeric products are novel, substantially linear, water-insoluble resins, somewhat soluble in organic solvents such as acetone and dimethylformamide and softening or melting in the temperature range of 105° to 180° C.

The new monomers may be prepared by reacting a vinylbenzyl halide, preferably the chloride or bromide, with the sodium salt of an oxazolidinone or oxazinidinone having the formula

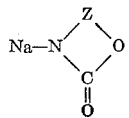

wherein Z has the aforementioned significance. The sodium salt of the oxazolidinone or oxazinidinone compound may be prepared by the action of sodium metal or sodium hydride on the corresponding oxazolidinone or oxazinidinone by the action of a sodium alkoxide such as sodium methoxide or ethoxide on said oxazolidinone or ozazinidinone. In general, it is desirable to prepare the sodium salt and without isolation thereof to proceed to the reaction with the vinylbenzyl halide to produce the desired N - vinylbenzyl oxazolidinone or oxazinidinone compound. The reaction is conveniently carried out in a solvent such as a lower alkanol, acetone, dioxane, dimethoxyethane or a liquid aromatic hydrocarbon. If desired an excess of the oxazolidinone or oxazinidinone reactant may be employed as a reaction solvent or cosolvent. The reaction proceeds by the condensation of equimolar proportions of the vinylbenzyl halide and the sodium salt of the oxazolidinone or oxazinidinone with the production of sodium halide as a by-product.

In carrying out the reaction for the preparation of the monomers, the reaction mixture is conveniently maintained at temperatures of from 25° to 100° C. for periods of from 2 to 20 hours to complete the reaction. Preferably, the reactants are contacted at temperatures of from 60° to 90° C., conveniently at the reflux temperature of the solvent employed, for periods of about 3 to 8 hours. On completion of the reaction the monomer product is separated, for example, by washing with water, dissolving in a solvent such as diethyl ether or a mixture of diethyl ether and a low boiling aliphatic petroleum distillate and crystallizing the desired product from such solution at low temperature. The crystallized product is then separated by conventional manipulations such as filtration, washing and drying.

The monomers are readily polymerized and copolymerized by conventional techniques such as by exposure to high energy radiation or by heating with a catalyst capable of yielding free radicals. Such polymerization can be carried out in mass or in a suitable inert solvent. In a preferred procedure a monomer of the invention or a mixture of such monomers is heated with a catalyst such as benzoyl peroxide, lauroyl peroxide, tert.-butyl hydroperoxide, azobisisobutyronitrile or the like at temperatures of from about 40° to 100° C. for periods of from a few minutes to a number of hours to accomplish the desired polymerization. On the completion of the polymerization the polymer or copolymer can be purified, if desired, by dissolving in a suitable solvent from which the polymer is then precipitated by addition of a nonsolvent. Homopolymers produced in accordance with the invention and copolymers of two or more of the monomers of the invention with each other are soluble in solvents such as acetone and dimethylformamide and relatively insoluble in aliphatic ethers and hydrocarbons. The solubility of copolymers of monomers of the invention with other monoethylenically unsaturated monomers such as styrene, vinyl chloride and acrylonitrile will vary somewhat depending upon the particular comonomer employed. In general, such copolymers are soluble in organic solvents such as acetone and dimethylformamide. The new homopolymers and copolymers are substantially insoluble in water and have excellent complexing ability with respect to iodine and other free halogens and with respect to somewhat polar organic compounds such as aniline and phenols. It is among the advantages of the invention that such polymers melt or soften below their thermal decomposition point so that they may be molded or extruded to form desired shapes such as films, filaments or the like.

The following examples illustrate the invention but are not to be construed as limiting the same.

*Example 1*

5.8 grams (0.25 gram-atom) of clean sodium metal was added portionwise to 150 milliliters of absolute ethanol in a flask fitted with a stirrer, condenser and dropping funnel. The sodium dissolved in the ethanol with the evolution of hydrogen to produce an alcoholic solution of sodium ethoxide. To this solution 56 grams (0.55 mole) of 5-methyl-2-oxazolidinone was added with stirring continued for a period of 20 minutes to produce N-sodio-5-methyl-2-oxazolidinone as an intermediate. To the solution of said intermediate 35 grams (0.25 mole) of vinylbenzyl chloride (a mixture of approximately 33 percent of the ortho-isomer and 67 percent of the para-isomer) was added and the resulting mixture heated at a temperature of 70° C. for 4 hours. During the heating period, 112 milliliters of ethanol was slowly distilled off. On completion of the reaction, the reaction mixture was poured into water and the resulting mixture extracted with ether. The ether layer was separated, washed with water until neutral and dried over anhydrous calcium sulfate. The dried ether solution was separated from the desiccant and cooled to —15° to —20° C. to induce crystallization of the product. The product crystals were recovered by filtration, washed with cold heptane and dried to obtain 18.3 grams of N-(vinylbenzyl)-5-methyl-2-oxazolidinone product in the form of yellow crystalline plates, melting at 58°–60° C.

A further portion of the product prepared in exactly similar fashion was recrystallized to produce a purified product in the form of colorless crystals, melting at 64°–65° C. This product was found to be soluble in ethanol, acetone, ether, benzene and dioxane at room temperature and in hot hexane while being insoluble in cold hexane, water, aqueous 5 percent hydrochloric acid and aqueous 5 percent sodium hydroxide solution. The infra-red spectrum and elemental analysis for C, H and N agreed with the assigned structure.

*Example 2*

A dispersion of 5.8 grams (0.25 gram atom) of sodium in toluene was prepared, allowed to settle and the excess toluene decanted and replaced with 200 ml. of dimethoxyethane. To the resulting mixture 27 grams (0.27 mole) of 5-methyl-2-oxazolidinone was added slowly and the entire mixture heated to the reflux temperature of about 80° C. Heating was continued for about 90 minutes with stirring to insure complete reaction of the sodium metal. Following this heating period a mixture of ortho and para vinylbenzyl chloride as employed in Example 1 was added dropwise until a total of 38 grams (0.25 mole) thereof had been introduced. Heating under reflux was continued for a further 6 hours. The reaction mixture was then filtered and the filtrate poured into water and worked up as in Example 1 to obtain an N(vinylbenzyl)-5-methyl - 2 - oxazolidinione product as a crystalline solid.

In exactly similar fashion other N-vinylbenzyl heterocyclic compounds are prepared by substituting an equimolar proportion of the following reactants for the 5-methyl-2-oxazolidinone in the above procedure to produce the indicated products:

(1) 5 - phenyl - 2 - oxazolidinone to produce N-vinylbenzyl-5-phenyl-2-oxazolidinone;
(2) 2 - oxazinidinone to produce N - vinylbenzyl-2-oxazinidinone;
(3) 5 - ethyl - 2 - oxazolidinone to produce N-vinyl-5-ethyl-2-oxazolidinone; and
(4) 4,5-dimethyl-2-oxazolidinone to produce N-vinyl-benzyl-4,5-dimethyl-2-oxazolidinone.

*Example 3*

2.5 parts by weight of N-vinylbenzyl-5-methyl-2-oxazolidinone was melted in a glass container with 0.1 part of benzoyl peroxide and the resulting mixture heated at 95°–100° C. for 4.25 hours. Polymerization was initiated readily and after 30 minutes it was observed that the liquid in the reactor had become extremely viscous. On completion of the polymerization reaction, the reaction mass was poured into alcohol from which it precipitated as a white solid. The latter polymer product was separated and dried to obtain a yield of 2 parts of homopolymer having a melting range of 105°–115° C.

*Example 4*

10 grams of the N-vinylbenzyl-5-methyl-2-oxazolidinone (hereinafter VBOM) was dissolved in 50 milliliters of a mixture of about equal parts of acetone and ethanol in a 500 ml. flask equipped with a stirrer, thermometer and condenser. To the resulting solution, 0.01 gram of α,α'-azobisisobutyronitrile was added as a catalyst and the mixture was heated for 18 hours at 80° C., then cooled and added to a large excess of diethyl ether to precipitate the vinylbenzyl-5-methyl-2-oxazolidinone polymer product. The latter was redissolved and reprecipitated from ether to obtain a purified polymer product in the form of a light yellow solid, softening at 144° C. and melting at 186° C.

*Example 5*

2 parts by weight of VBOM was mixed with 2.25 parts of styrene and 0.1 part of benzoyl peroxide and heated for 2 hours on a steam bath to accomplish copolymerization. The crude reaction product, a viscous clear liquid, was dissolved in dimethylformamide and precipitated by pouring into methanol. The resulting white solid copolymer product was recovered, dried and found to have a melting range of 118°–130° C.

*Example 6*

2.36 parts of VBOM and 2.46 parts of acrylonitrile were copolymerized by the method of Example 5. The resulting copolymer product was dissolved in dimethylformamide and cast on a glass plate to produce a slightly yellow, clear, tough film.

In exactly similar fashion, substantially equal parts by weight of VBOM and vinylidene chloride were copolymerized to produce a clear, tough film of copolymer.

The polymers and copolymers can be employed, for example, in separating or concentrating phenols from phenolic waste water. Illustrative of this use, 0.95 gram of powdered poly(N-vinylbenzyl-5-methyl-2-oxazolidinone was suspended in 50 ml. of an aqueous 1 percent by weight phenol solution for 18 hours at room temperature. The polymer was then allowed to settle and an aliquot of the supernatant liquid analyzed for phenol content. The results showed that 0.2 gram of phenol was complexed and held per gram of polymer.

The monomeric compounds of the invention also serve as intermediates for producing pure β-hydroxy secondary amines which are difficult or impossible to produce by conventional methods. Thus, for example, caustic hydrolysis of N-vinylbenzyl-5-ethyl-2-oxazolidinone produces N-vinylbenzyl N-(β-hydroxybutyl) amine in good yield.

We claim:
1. Vinylbenzyl heterocyclic compounds having the formula

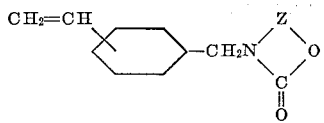

wherein Z represents a bivalent hydrocarbon radical selected from the group consisting of -CH$_2$CH$_2$-, -CH$_2$CH$_2$CH$_2$-, -CH$_2$CH$_2$CH$_2$CH$_2$- -CH$_2$CH$_2$CH$_2$CH$_2$CH$_2$-, -CH$_2$CH$_2$CH$_2$CH$_2$CH$_2$CH$_2$- and

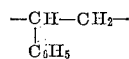

2. N-vinylbenzyl-5-methyl-2-oxazolidinone.
3. N-vinylbenzyl-2-oxazinidinone.
4. N-vinylbenzyl-5-ethyl-2-oxazolidinone.
5. N-vinylbenzyl-5-phenyl-2-oxazolidinone.

6. Polymeric compositions comprising in polymeric, chemically combined form at least one compound having the formula

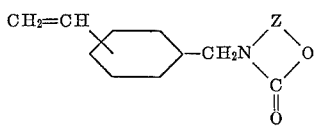

wherein Z represents a bivalent hydrocarbon radical selected from the group consisting of -CH$_2$CH$_2$-, -CH$_2$CH$_2$CH$_2$-, -CH$_2$CH$_2$CH$_2$CH$_2$- -CH$_2$CH$_2$CH$_2$CH$_2$CH$_2$-, -CH$_2$CH$_2$CH$_2$CH$_2$CH$_2$CH$_2$- and

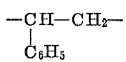

7. Poly(N-vinylbenzyl-5-methyl-2-oxazolidinone).

8. A copolymer consisting essentially of polymeric, chemically combined styrene and N-vinylbenzyl-5-methyl-2-oxazolidinone.

9. A copolymer consisting essentially of polymeric chemically combined acrylonitrile and N-vinylbenzyl-5-methyl-2-oxazolidinone.

References Cited by the Examiner
UNITED STATES PATENTS

| | | | |
|---|---|---|---|
| 2,948,708 | 8/1960 | Walles et al. | 260—88.3 |
| 2,966,496 | 12/1960 | Arend et al. | 260—88.3 |

JOSEPH L. SCHOFER, *Primary Examiner.*

H. N. BURSTEIN, JAMES A. SEIDLECK, *Examiners.*